H. C. HEBIG.
PHOTOGRAPHIC APPARATUS.
APPLICATION FILED FEB. 13, 1909.
972,373.
Patented Oct. 11, 1910.
2 SHEETS—SHEET 1.
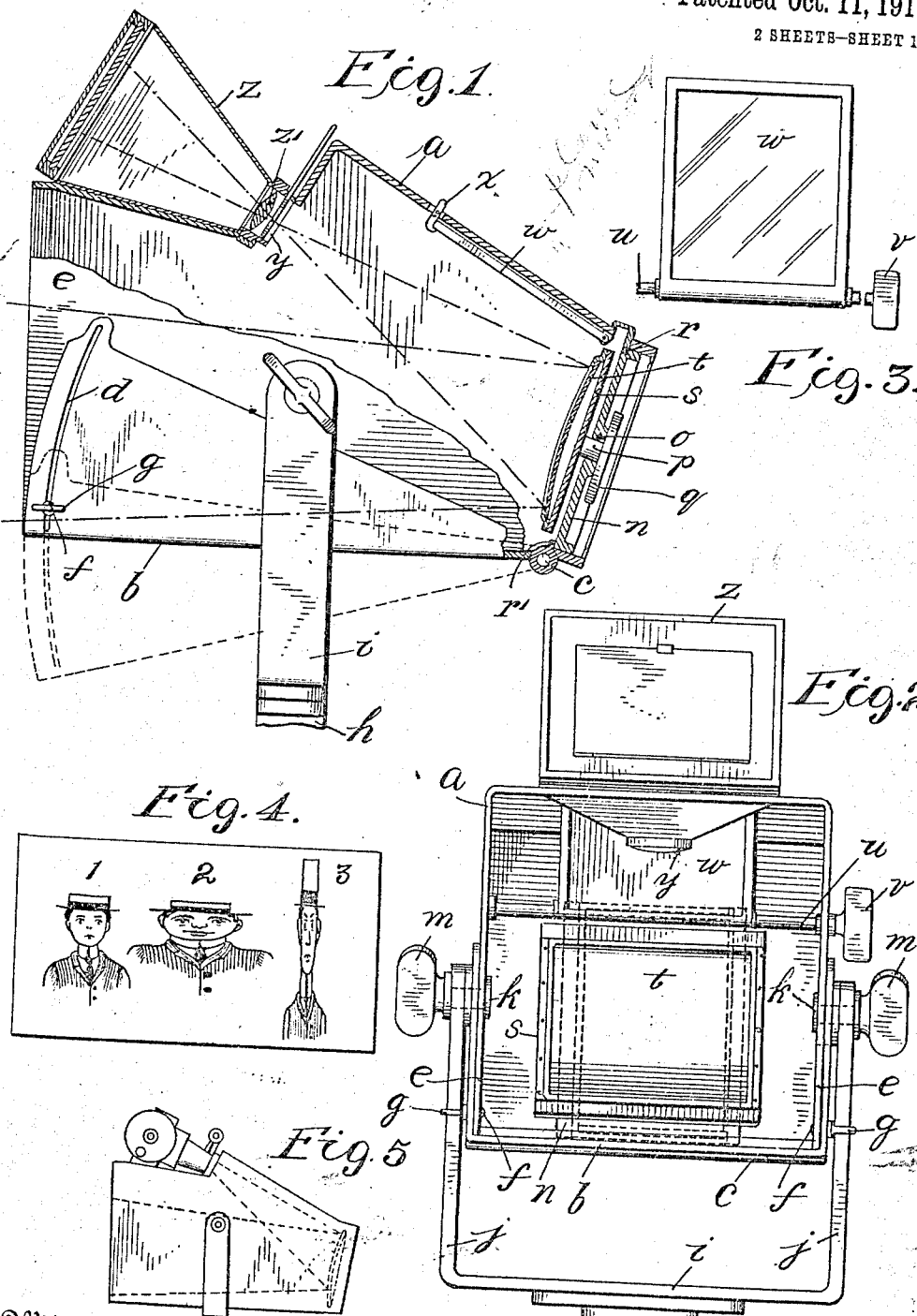

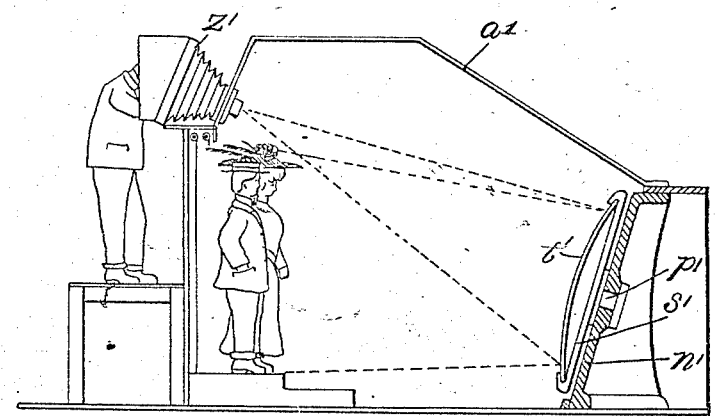
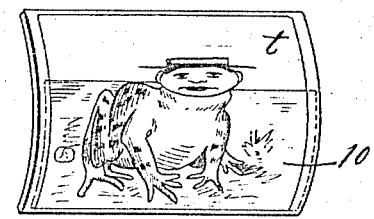
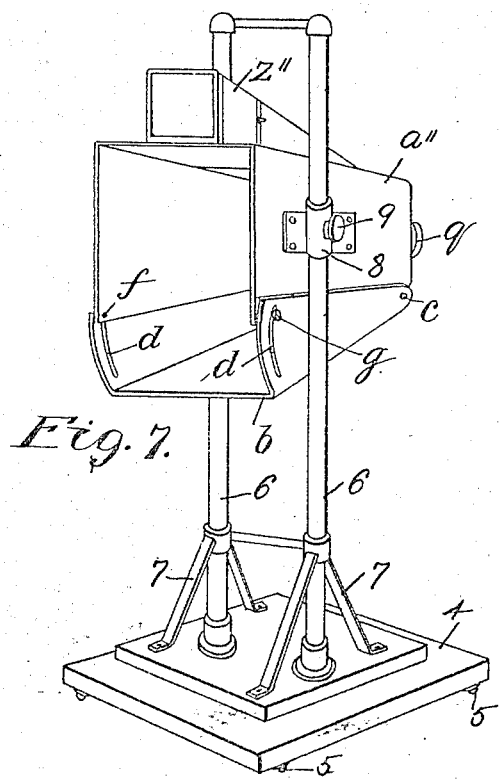
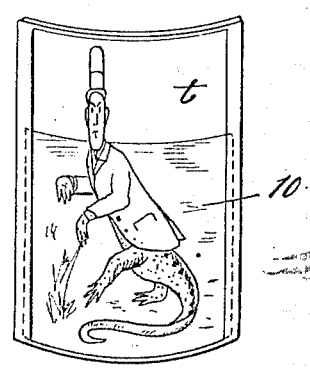

UNITED STATES PATENT OFFICE.

HARRY C. HEBIG, OF NEW YORK, N. Y., ASSIGNOR TO JAMES HAMILTON, OF EAST ORANGE, NEW JERSEY.

PHOTOGRAPHIC APPARATUS.

972,373.  Specification of Letters Patent.  Patented Oct. 11, 1910.

Application filed February 13, 1909. Serial No. 477,794.

*To all whom it may concern:*

Be it known that I, HARRY CONRAD HEBIG, a citizen of the United States, residing at New York city, in the county of New York and State of New York, have invented certain new and useful Improvements in Photographic Apparatus, of which the following is a specification, reference being had to the accompanying drawings.

My invention relates to improvements in photographic apparatus; and an object of my invention is to provide a series of photographs some of which will be distorted.

Another object of my invention is to provide an apparatus of the character described which will be simple in construction, comparatively cheap in manufacture and efficient and durable in use.

In the drawings illustrating the principle of my invention and the best mode now known to me of applying that principle, Figure 1 is an elevation partly in section of so much of a photographic apparatus as is necessary to illustrate my invention; Fig. 2 is a view looking to the right in Fig. 1; Fig. 3 is a detail showing the plane mirror and its rotating device; Fig. 4 shows a card upon which are a series of photographs of the same individual as taken by my new apparatus; Fig. 5 shows my new apparatus equipped with a camera for taking moving pictures; Fig. 6 is a modified form of my new photographic apparatus adapted for use in taking full-length pictures; Fig. 7 is a perspective view of a stand showing a modified form of my apparatus; and Figs. 8 and 9 are details showing the mirror equipped with body designs.

The housing or casing $a$ is provided with a movable bottom $b$ hinged at $c$ and formed with a slot $d$ at each side. The lateral walls $e$ of the casing $a$ are each provided with a threaded stud $f$ and these studs project each through one of the slots $d$ and are engaged by thumb-nuts $g$. The latter serve to clamp the hinged bottom $b$ of the housing in adjusted position. The casing $a$ is supported by a pedestal $h$ upon which rests a U-shaped bracket $i$. The arms $j$ of the latter extend upwardly on each side of the casing $a$ and through the upper end of each arm $j$ and the lateral wall $e$ of the casing adjacent thereto passes a threaded stud $k$, the outer end of which is engaged by the thumb-nut $m$. The arrangement just described permits the casing $a$ to swing in the arms $j$ and to be clamped in adjusted position by the thumbnuts $m$. The front end of the casing $a$ is open and in it is slidably mounted a carrier-plate $n$ formed with a central hole $o$ through which passes a shaft $p$ upon the outer end of which is formed integral a turn-knob or disk $q$. The carrier-plate $n$ is slidable in the casing $a$ and its inward travel is limited by the flange $r$. Fast to the inner end of the shaft $p$ is a mirror-carrier $s$, in which is mounted a curved mirror $t$. Journaled in the sides $e$ of the casing $a$ is a shaft $u$, one end of which is provided with a turn-knob $v$. Upon the shaft $u$ is mounted a plane mirror $w$, which may be turned upwardly, as is shown in Fig. 1 and held by the catch $x$. The casing $a$ is formed with an opening $y$ in which is placed the lens $z'$ of a camera $z$ supported by the casing $a$.

In taking pictures with the apparatus just described, the plate $n$ is moved outwardly far enough to allow the lower end of the plane mirror $w$ to rest against the shoulder $r'$. With the apparatus so adjusted, the normal photograph is taken. The plane mirror $w$ is now turned upwardly and fastened by the catch $z$. The carrier-plate $n$ is moved inwardly against the flange $r$ so that the curved mirror $t$ now reflects a distorted figure into the camera. Upon the central portion of the same photographic plate or negative is taken the distorted photograph marked 2 in Fig. 4. The disk $q$ is now turned, turning with it the shaft $p$ and the mirror-carrier $s$, thereby bringing the curved mirror $t$ at right angles to its former position. Upon the same photographic plate or negative is now taken the distorted photograph marked 3 in Fig. 4. It will be understood that the photographs shown in Fig. 4 are of the same person.

The arrangement shown in Fig. 6 is for taking full-length figures and comprises a housing $a'$ in which is mounted a slidable support $n'$. In the latter is journaled a shaft $p$, upon which is mounted the mirror-carrier $s'$. The curved mirror $t'$ is of a size sufficiently large to reflect the full length of the body of the subject into the camera $z'$.

In Fig. 7, a street corner stand is shown consisting of a platform base 4 mounted on roller-casters 5 and supporting the standards 6. The latter are held stiffly in position by the braces 7. The casing $a''$ carries on each side a sleeve-bracket 8 and a set-screw 9, the latter holding the casing $a''$ in adjusted position. Upon the top of the casing $a''$ is mounted a camera $a'''$.

In Figs. 8 and 9, the lower part of the mirror is covered by a card 10 having printed thereon a fanciful body design. In this case only the head of the subject is reflected into the camera.

I claim:

1. In an apparatus of the character described, the combination with a suitable casing and a camera mounted therein; of means for reflecting a distorted image into said camera; said means being rotatable to vary said distorted image.

2. In an apparatus of the character described, the combination with a casing and a camera mounted therein; of means for reflecting a distorted image into said camera; and a fanciful design placed over said means.

3. In an apparatus of the character described, the combination with a camera; of a plane mirror adapted to reflect normal images into said camera; and a curved mirror separate from said plane mirror and adapted to reflect distorted images into said camera.

4. A photographic apparatus consisting of a casing provided with a top and a bottom which are relatively movable; a camera carried by said casing; and a rotary curved mirror carried by said casing and adapted to reflect into said camera.

5. A photographic apparatus consisting of a casing provided with a camera; and a rotary curved mirror adapted to reflect distorted images into said camera and carried by said casing.

6. A photographic apparatus consisting of a casing provided with a camera; a plane mirror carried by said casing and adapted to reflect normal images into said camera; and a curved mirror carried by said casing and adapted to reflect distorted images of the same subject into said camera; said mirrors being arranged to be thrown into and out of active position alternately.

In testimony whereof I have hereunto set my hand at said New York city, in the presence of the two undersigned witnesses, this sixth day of February, A. D., 1909.

HARRY C. HEBIG.

Witnesses:
JAMES HAMILTON,
MARGARET HAMILTON.